United States Patent
Takagi

(10) Patent No.: US 9,999,078 B2
(45) Date of Patent: Jun. 12, 2018

(54) COMMUNICATION APPARATUS AND CONTROL METHOD THEREOF

(71) Applicant: CANON KABUSHIKI KAISHA, Tokyo (JP)

(72) Inventor: Toshiyuki Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 14/711,924

(22) Filed: May 14, 2015

(65) Prior Publication Data

US 2015/0341968 A1    Nov. 26, 2015

(30) Foreign Application Priority Data

May 20, 2014   (JP) ................... 2014-104514

(51) Int. Cl.
*H04W 76/02* (2009.01)
*H04L 29/12* (2006.01)
(Continued)

(52) U.S. Cl.
CPC ....... *H04W 76/021* (2013.01); *H04L 61/2007* (2013.01); *H04L 67/14* (2013.01);
(Continued)

(58) Field of Classification Search
CPC . H04W 76/021; H04W 76/023; H04W 84/12; H04L 61/2007; H04L 67/14
See application file for complete search history.

(56) References Cited

U.S. PATENT DOCUMENTS

2008/0147882 A1   6/2008  Reif et al.
2009/0170431 A1*  7/2009  Pering ................. H04B 5/02
                                                   455/41.1
(Continued)

FOREIGN PATENT DOCUMENTS

CN      103249085 A    8/2013
JP      2007166538 A   6/2007
(Continued)

OTHER PUBLICATIONS

RFC2131 Dynamic Host Configuration Protocol.*
The above patent documents were cited in a European Search Report dated Oct. 19, 2015, that issued in the corresponding European Patent Application No. 15168455.2.
Anonymous: "raspbian—Where are the WiFi config settings stored?—Raspberry Pi Stack Exchange", URL: http://raspberrypi.stackexchange.com/questions/2144/where-are-the-wifi-config-settings-stored, Oct. 9, 2012.
(Continued)

*Primary Examiner* — Jeffrey M Rutkowski
*Assistant Examiner* — Basil Ma
(74) *Attorney, Agent, or Firm* — Cowan, Liebowitz & Latman, P.C.

(57) ABSTRACT

A communication apparatus comprises a first communication unit that communicates with an external apparatus and to share, with the external apparatus, first and second communication parameters for establishing a communication with the external apparatus using a second communication unit that communicates with the external apparatus using the first communication parameter set by the user operation or the second communication parameter shared by the first communication unit; a holding unit that holds the communication parameter used in the communication with the external apparatus using the second communication unit; and a control unit that controls the holding unit, in the case where the holding unit holds the second communication parameter, to hold the second communication parameter so that the second communication parameter is distinguished from the first communication parameter that is set based on the user operation.

23 Claims, 12 Drawing Sheets

(51) Int. Cl.
    *H04L 29/08*     (2006.01)
    *H04W 84/12*     (2009.01)

(52) U.S. Cl.
    CPC ....... *H04W 76/023* (2013.01); *H04L 61/2015* (2013.01); *H04W 84/12* (2013.01)

(56) References Cited

U.S. PATENT DOCUMENTS

| | | | |
|---|---|---|---|
| 2009/0227282 A1* | 9/2009 | Miyabayashi | H04L 63/0492 455/552.1 |
| 2010/0082999 A1* | 4/2010 | Ando | H04L 63/083 713/183 |
| 2012/0249598 A1 | 10/2012 | Fukushima | |
| 2013/0036231 A1* | 2/2013 | Suumaki | H04W 12/04 709/228 |
| 2013/0324042 A1* | 12/2013 | Shinomiya | H04W 40/24 455/41.1 |
| 2014/0240777 A1* | 8/2014 | Itogawa | G06F 3/1292 358/1.15 |
| 2014/0380074 A1* | 12/2014 | Kimura | G06F 1/324 713/322 |
| 2015/0133194 A1* | 5/2015 | Shintani | H04W 40/02 455/557 |
| 2016/0227016 A1* | 8/2016 | Kim | H04M 1/72522 |

FOREIGN PATENT DOCUMENTS

| | | |
|---|---|---|
| JP | 2013-162322 A | 8/2013 |
| JP | 2013157809 A | 8/2013 |
| JP | 2013251873 A | 12/2013 |
| JP | 2014017770 A | 1/2014 |
| JP | 2014-082587 A | 5/2014 |
| RU | 2487493 C2 | 7/2013 |
| RU | 2491720 C2 | 8/2013 |
| WO | 2008049214 A | 5/2008 |
| WO | 2008049214 A1 | 5/2008 |

OTHER PUBLICATIONS

Anonymous: "wireless—Where are store wifi connection parameters?—Ask Ubuntu", URL: http://askubuntu.com/questions/212089/where-are-store-wifi-connection-parameters, Nov. 5, 2012.
The above patent documents were cited in a Dec. 12, 2016 Russian Office Action, that issued in Russian Patent Application No. 2015118882.
The above documents were cited in a Japanese Office Action dated Mar. 16, 2018, a copy of which is enclosed ithout an English translation, that issued in the corresponding Japanese Patent Application No. 2014-104514.
The above documents were cited in a Chinese Office Action dated Feb. 24, 2018, a copy of which is enclosed with an English translation, that issued in the corresponding Chinese Patent Application No. 201510257112.X.

* cited by examiner

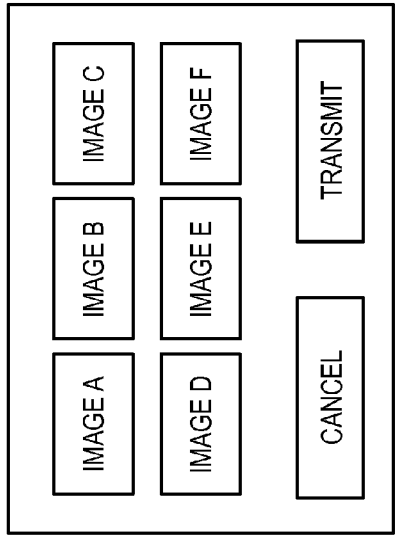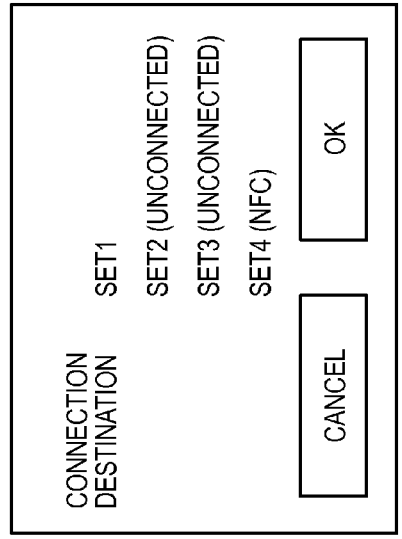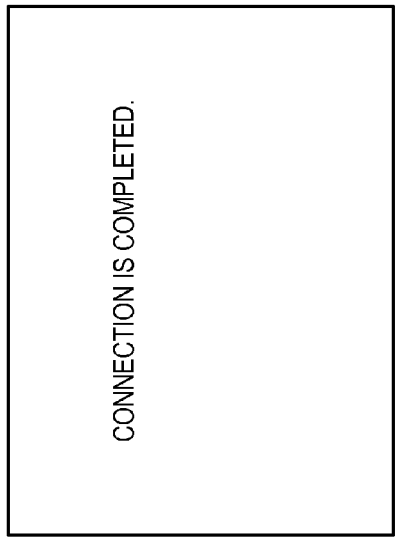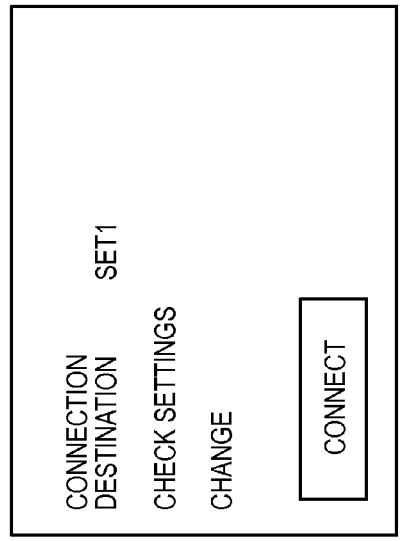

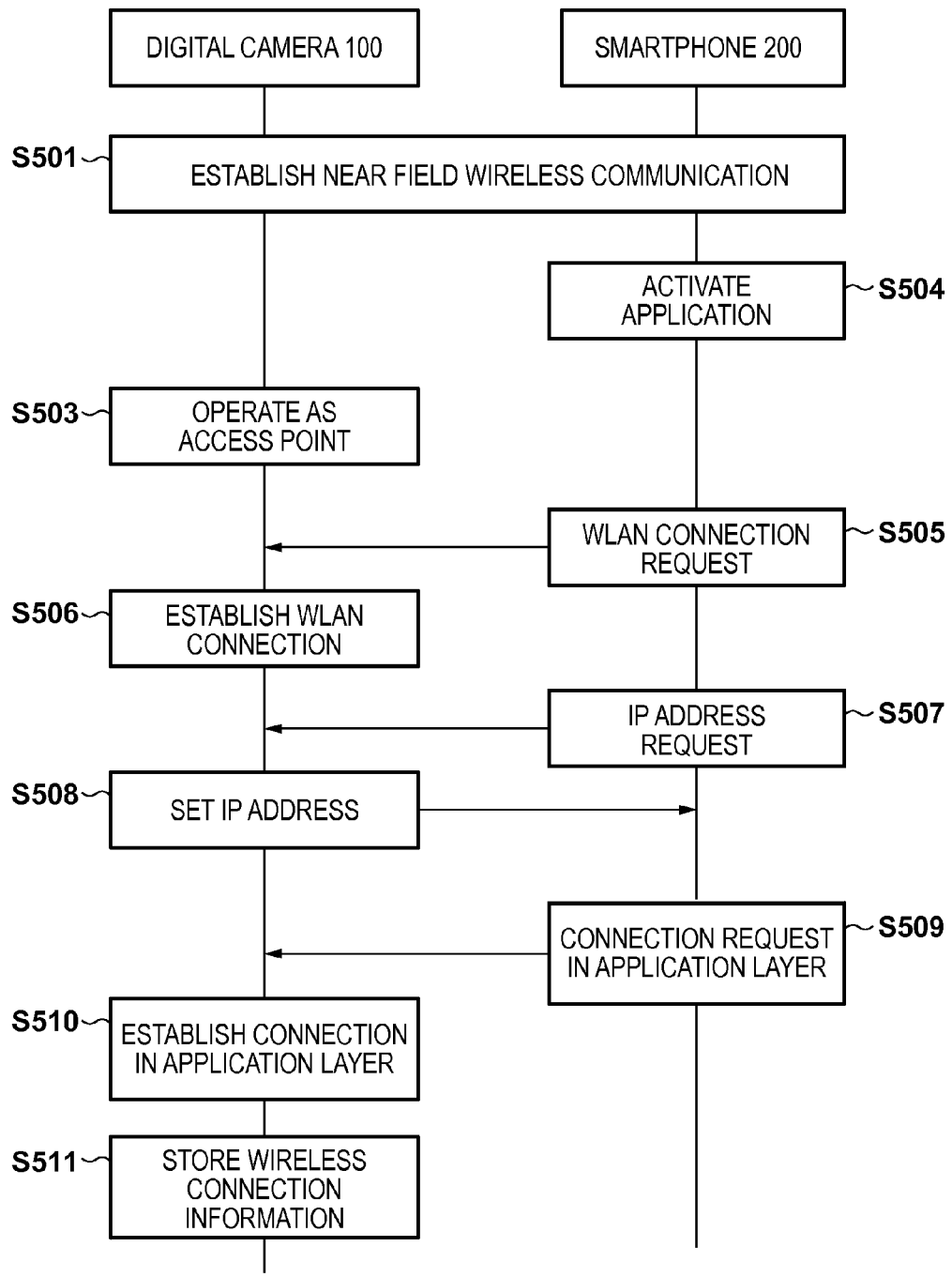

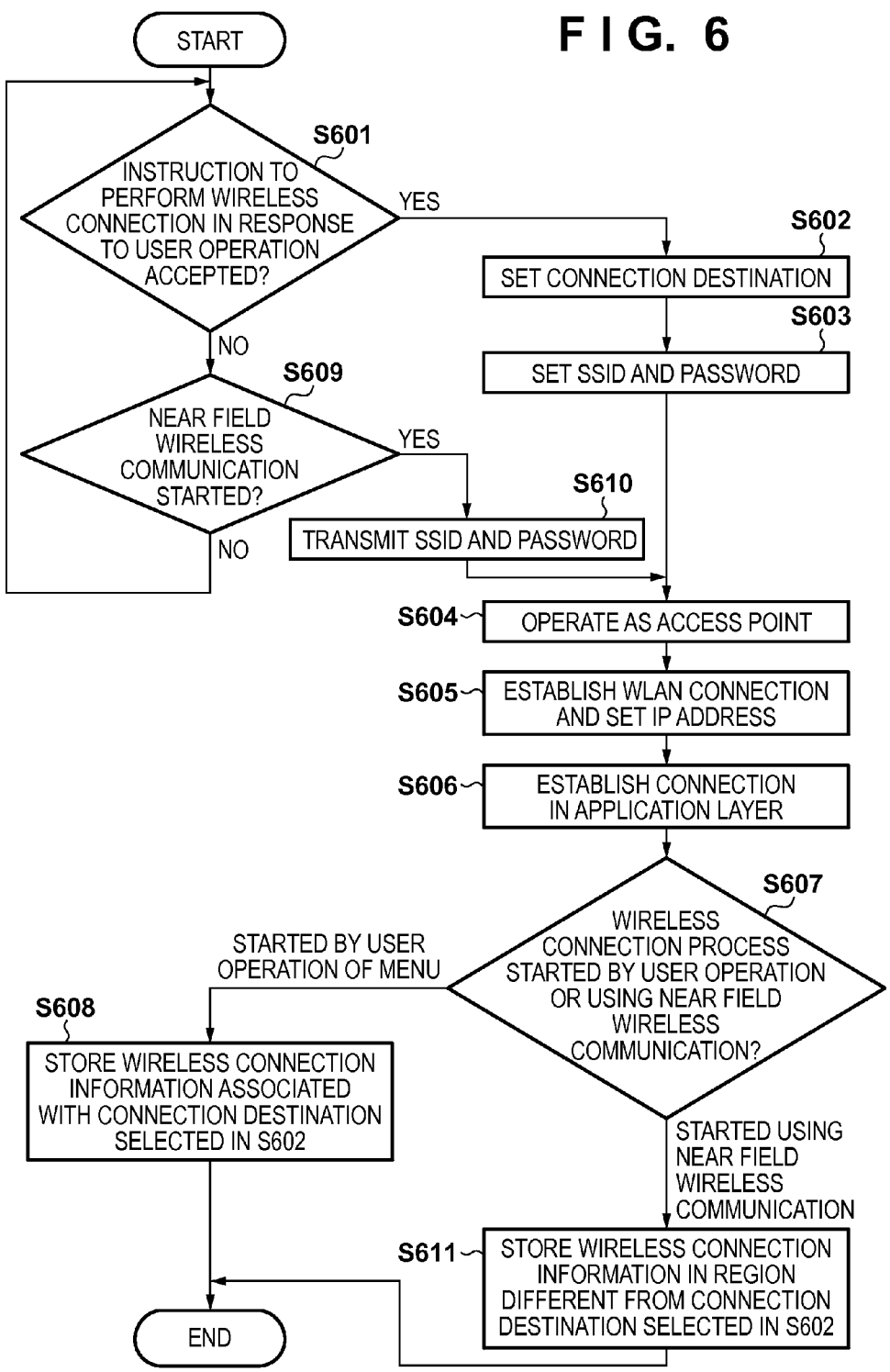

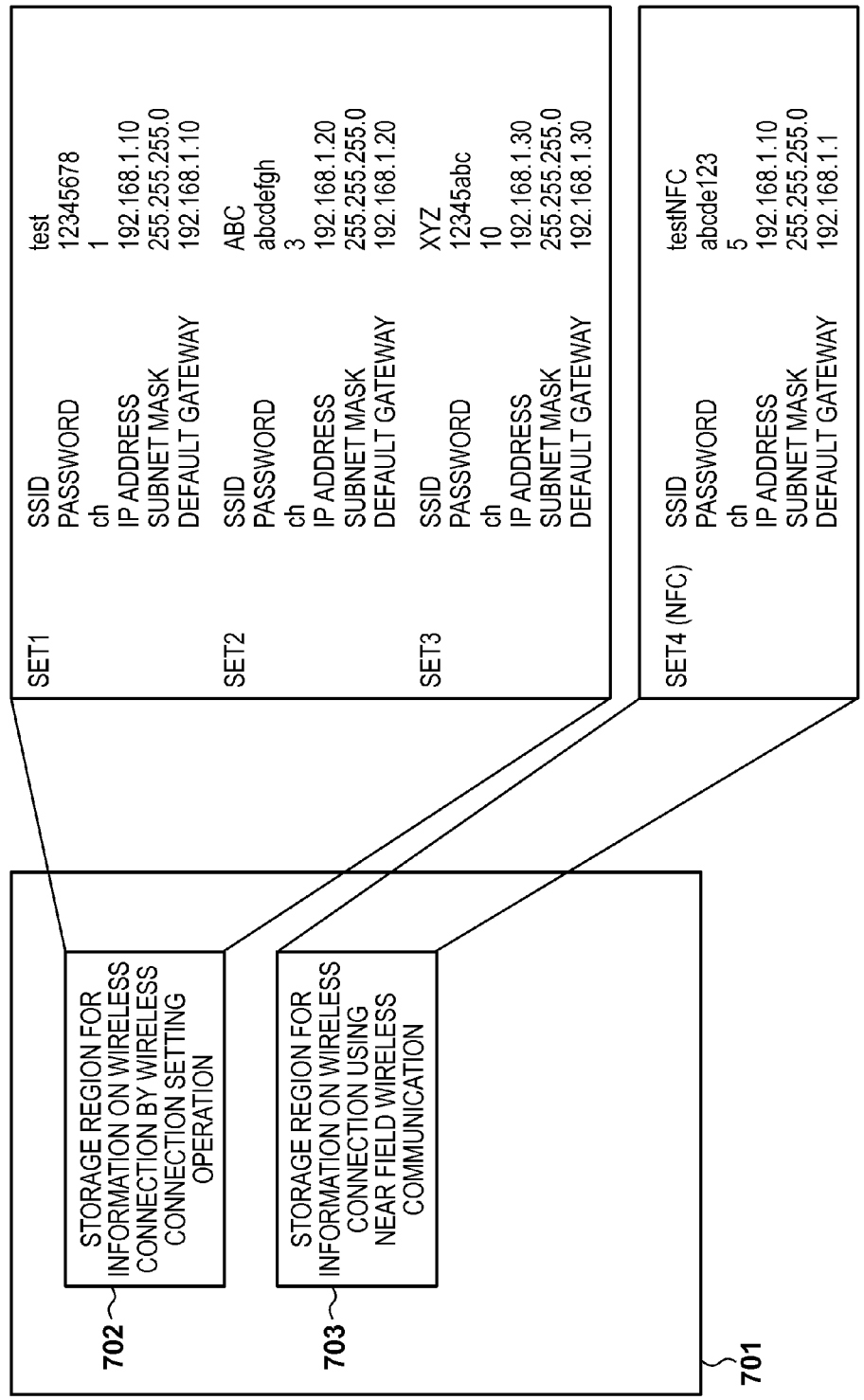

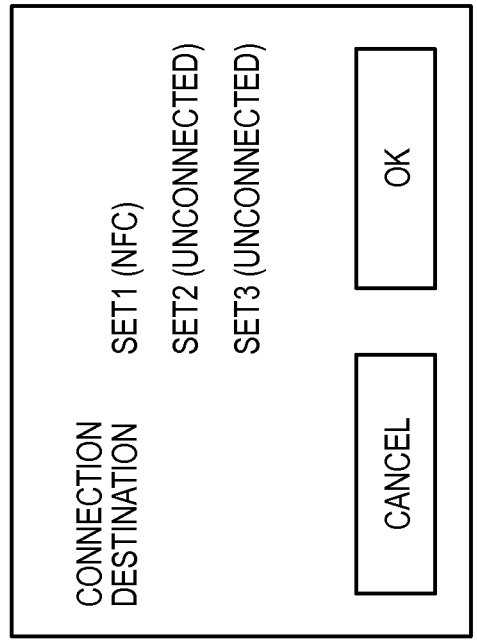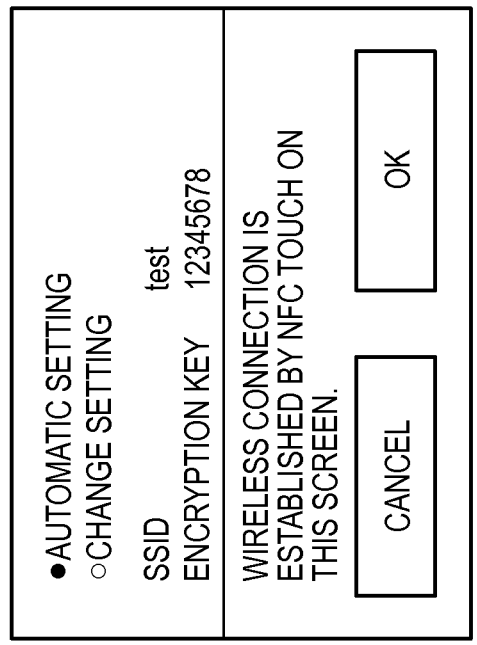

COMMUNICATION APPARATUS AND CONTROL METHOD THEREOF

BACKGROUND OF THE INVENTION

Field of the Invention

The present invention relates to a communication apparatus and a control method thereof, and particularly relates to the control of communication with another device.

Description of the Related Art

In recent years, a system in which a digital camera and a smartphone are connected with each other using wireless LAN to enable exchange of images therebetween has been known. Generally, a user is required to select or input some communication parameters such as an SSID and a password for connection using wireless LAN, and thus the procedure to establish the connection is complicated.

In order to solve the complexity of the connection procedure, various methods have been devised. For example, Japanese Patent Laid-Open No. 2013-162322 discloses a technique in which, once a connection is established, parameters used in the connection are stored as a connection history so as to simplify the connection procedure thereafter.

Further, Japanese Patent Laid-Open No. 2014-82587 discloses a technique to share parameters used in a connection, using a near field communication function such as NFC (Near Field Communication). According to this disclosure, the time and trouble of the user for establishing the first wireless LAN connection can be saved, which cannot be solved by Japanese Patent Laid-Open No. 2013-162322. Instead, there is a constraint that the devices need to be brought close to each other for the connection. Then, it is conceivable that connections can be established more efficiently by combining this with Japanese Patent Laid-Open No. 2013-162322 mentioned above, so that the work is saved by the near field wireless communication function at the first time, and is further saved using the connection history from the next time.

However, if the aforementioned conventional techniques are simply combined, there are disadvantages as described below. That is, wireless connection information stored when a wireless connection is established by a wireless connection setting operation may be possibly overwritten, with information on the wireless connection using near field wireless communication, by performing near field wireless communication that allows a wireless connection to be established only by bringing the devices close to each other. In particular, since the connection can be established conveniently by a simple way of just bringing them close to each other, the possibility of overwriting the connection history is considered to be high. In this case, the user is required to perform the wireless connection setting operation again for connection with the device that corresponds to the wireless connection information stored when the wireless connection has been established by the wireless connection setting operation.

SUMMARY OF THE INVENTION

The present invention has been made in consideration of the aforementioned problems, and realizes a technique to appropriately manage connection information with devices that have ever been connected.

In order to solve the aforementioned problems, the present invention provides a communication apparatus comprising: a first communication unit configured to communicate with an external apparatus and to share, with the external apparatus, first and second communication parameters for establishing a communication with the external apparatus using a second communication unit that is different from the first communication unit; an accepting unit configured to accept a user operation; the second communication unit configured to communicate with the external apparatus using one of the first communication parameter that is set based on the user operation accepted by the accepting unit and the second communication parameter shared by the first communication unit; a holding unit configured to hold the communication parameter used in the communication with the external apparatus using the second communication unit; and a control unit configured to control the holding unit, in the case where the holding unit holds the second communication parameter shared by the first communication unit, to hold the second communication parameter so that the second communication parameter is distinguished from the first communication parameter that is set based on the user operation accepted by the accepting unit.

In order to solve the aforementioned problems, the present invention provides a control method of a communication apparatus which has a first communication unit and a second communication unit configured to communicate with an external apparatus, the method comprising: a first communication step of sharing, with the external apparatus, first and second communication parameters for establishing a communication with the external apparatus using the second communication unit that is different from the first communication unit; a step of accepting an user operation; a second communication step of communicating with the external apparatus by the second communication unit using one of the first communication parameter that is set based on the accepted user operation and the second communication parameter shared in the first communication step; a holding step of holding the communication parameter used in the communication with the external apparatus by the second communication unit; and in the case where the second communication parameter shared in the first communication step is held in the holding step, a control step of controlling the second communication parameter to be held so as to be distinguished from the first communication parameter that is set based on the accepted user operation.

According to the present invention, it is possible to appropriately manage connection information with devices that have previously been connected.

Further features of the present invention will become apparent from the following description of exemplary embodiments (with reference to the attached drawings).

BRIEF DESCRIPTION OF THE DRAWINGS

FIGS. 4A to 4H are views showing examples of GUI screens to perform a wireless connection information storing process according to the First embodiment.

FIG. 5 is a sequence diagram showing the procedure to start a wireless connection using near field wireless communication in the First embodiment.

FIG. 6 is a flowchart showing the wireless connection information storing process according to the First embodiment.

FIG. 7 is a diagram showing examples of wireless connection information according to the First embodiment.

FIGS. 8A and 8B are views showing examples of GUI screens to perform a wireless connection information storing process according to the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Hereinafter, a system using a digital camera and a smartphone as an image capturing apparatus of the present invention and a communication partner device, in which the image capturing apparatus and the communication partner device are wirelessly connected with each other will be described. In this embodiment, the smartphone that is a kind of mobile phone is assumed as a communication partner device, but other portable electronic devices such as a camera phone and a tablet terminal also are applicable. Further, information processing apparatuses such as a personal computer with a camera may be used.

Configuration of Digital Camera 100

Figure 1:
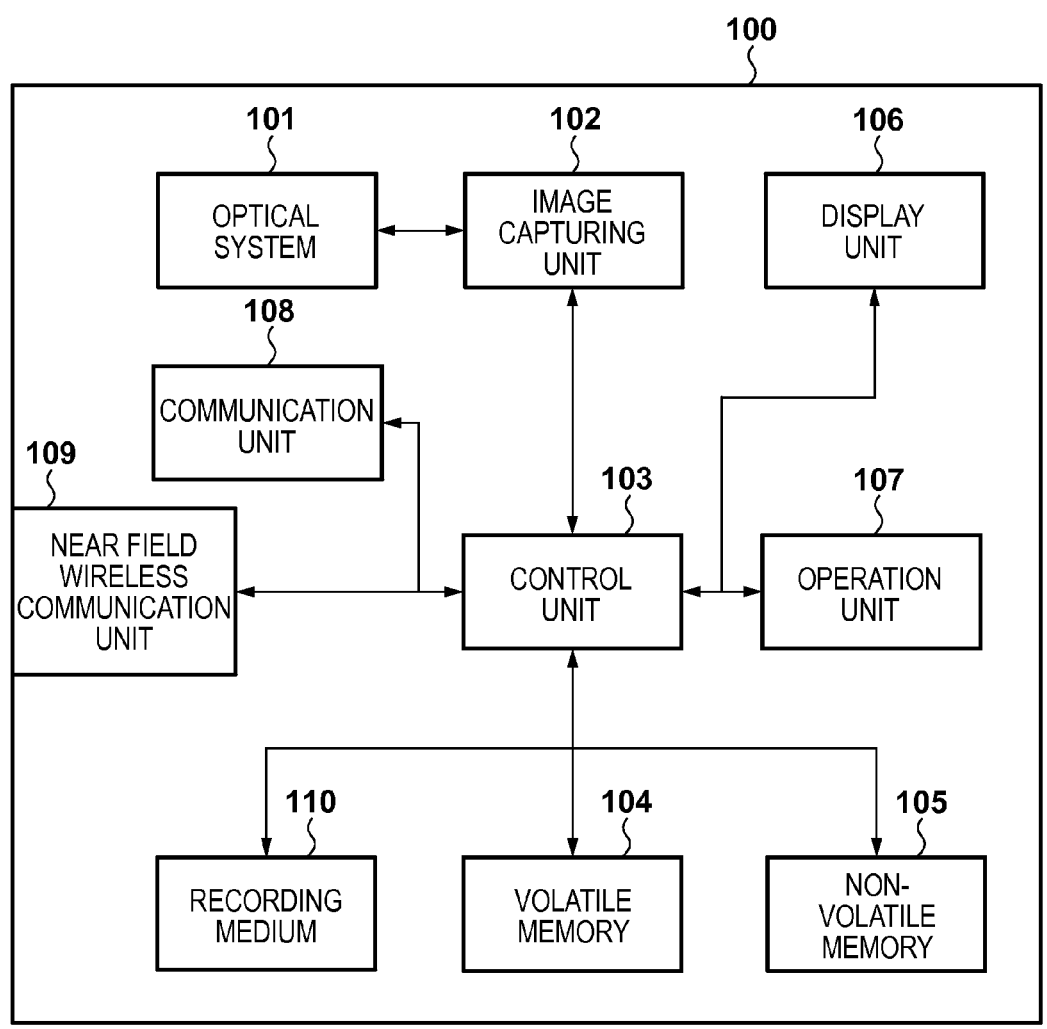
FIG. 1 is a block diagram showing a configuration of an image capturing apparatus according to the first embodiment.

The configuration and functions of a digital camera 100 of an embodiment according to the present invention will be schematically described with reference to FIG. 1.

An optical system 101 is comprised by a lens group including a zoom lens and a focus lens, and a shutter having an aperture diaphragm function. An image capturing unit 102 is an image capturing element comprised by CCD, CMOS, or the like, that converts an object image into electric signals. The image capturing unit 102 includes an A/D converter that converts analog signals output from the image capturing element into digital signals.

A volatile memory 104 is a temporary storage device such as RAM that stores still image data or moving image data (hereinafter, referred to as image data) output from the image capturing unit 102. Further, the volatile memory 104 stores various items of information such as file system information and management information in addition to the image data, and further serves as a working memory of a control unit 103. Further, the volatile memory 104 serves as a buffer memory when recording or reproducing images. The work area of the control unit 103 is not limited to the volatile memory 104, and may be an external hard disk or a memory card, which will be described below.

An operation unit 107, for example, is a switch, a cursor key, a touch panel, or the like, that accepts user operations such as power on/off, recording start/stop of moving images, still image capture, zoom operation, operation mode switching, which will be described below, and operations using GUI screens.

A non-volatile memory 105, for example, is a secondary storage device such as EEPROM in which data can be electrically erased and recorded. The non-volatile memory 105 stores constants, programs, or the like, for operating the control unit 103. The programs herein mean programs for executing procedures of various flowcharts, which will be described below. Further, the non-volatile memory 105 stores captured image files, and connection history information such as wireless connection information, which will be described below.

The control unit 103 has a CPU, an input and output circuit, a timer circuit, and the like, where the CPU develops the programs stored in the non-volatile memory 105 to the work area of the volatile memory 104 and executes them, thereby controlling the overall operation of the apparatus.

A display unit 106 displays viewfinder images when capturing, captured images, characters for interactive operations, or the like. The display unit 106, for example, is a display device such as a liquid crystal display and an organic EL display. The display unit 106 may be integrated with the digital camera 100, or may be an external device connected to the digital camera 100.

A communication unit 108 is an interface for connection with an external apparatus. The digital camera 100 of this embodiment can exchange data with the external apparatus via the communication unit 108. For example, image data generated in the image capturing unit 102 can be transmitted to the external apparatus via the communication unit 108. In this embodiment, the communication unit 108 includes an interface for communicating with the external apparatus using a so-called wireless LAN in accordance with the IEEE802.11 standard. The control unit 103 realizes wireless communication with the external apparatus by controlling the communication unit 108. The communication system is not limited to the wireless LAN, and examples thereof include an infrared communication system. The digital camera 100 needs only to have a unit configured to access the communication unit 108, and does not necessarily have the communication unit. Further, communication with a smartphone 200 may be performed by adding the communication unit to the digital camera 100 as an external accessory. Further, although the digital camera 100 of this embodiment is a kind of an access point (hereinafter, referred to as AP), the digital camera 100 can operate as a simplified AP (hereinafter, referred to as simple AP) with further limited functions, by operating the communication unit 108 in an AP mode. When the digital camera 100 operates as a simple AP, the digital camera 100 forms a network by itself. Apparatuses in the periphery of the digital camera 100 recognize the digital camera 100 as an AP device, and are enabled to participate in the network formed by the digital camera 100. The programs for operating the digital camera 100 as described above are held in the non-volatile memory 105.

Although the digital camera 100 of this embodiment is a kind of AP, it is a simple AP that does not have a gateway function to forward data received from a client device to an internet provider, or the like. Accordingly, even if the digital camera 100 receives data from another apparatus participating in the network which it has formed, the digital camera 100 cannot forward the data to another network such as the internet.

A near field wireless communication unit 109, for example, is comprised by an antenna for wireless communication, a modulation and demodulation circuit for processing wireless signals, a communication controller, and the like. The near field wireless communication unit 109 outputs modulated wireless signals from the antenna, and demodulates wireless signals received by the antenna. Thus, a non-contact near field communication in accordance with the ISO/IEC 18092 standard (so-called NFC: Near Field Communication) is realized. The near field wireless communication unit 109 of this embodiment is provided at a lateral part of the digital camera 100. The digital camera 100 transmits and receives wireless connection information to and from the smartphone 200 via the near field wireless communication unit 109.

A recording medium 110 can record image data output from the image capturing unit 102. The recording medium 110 may be detachable from the digital camera 100, or may be incorporated in the digital camera 100. That is, the digital camera 100 needs only to have at least a unit configured to access the recording medium 110. The recording medium 110 allows image data stored in the volatile memory 104 to be recorded therein, or already recorded image files or various items of information on control of the camera to be read out therefrom.

Configuration of Smartphone 200

Figure 2:
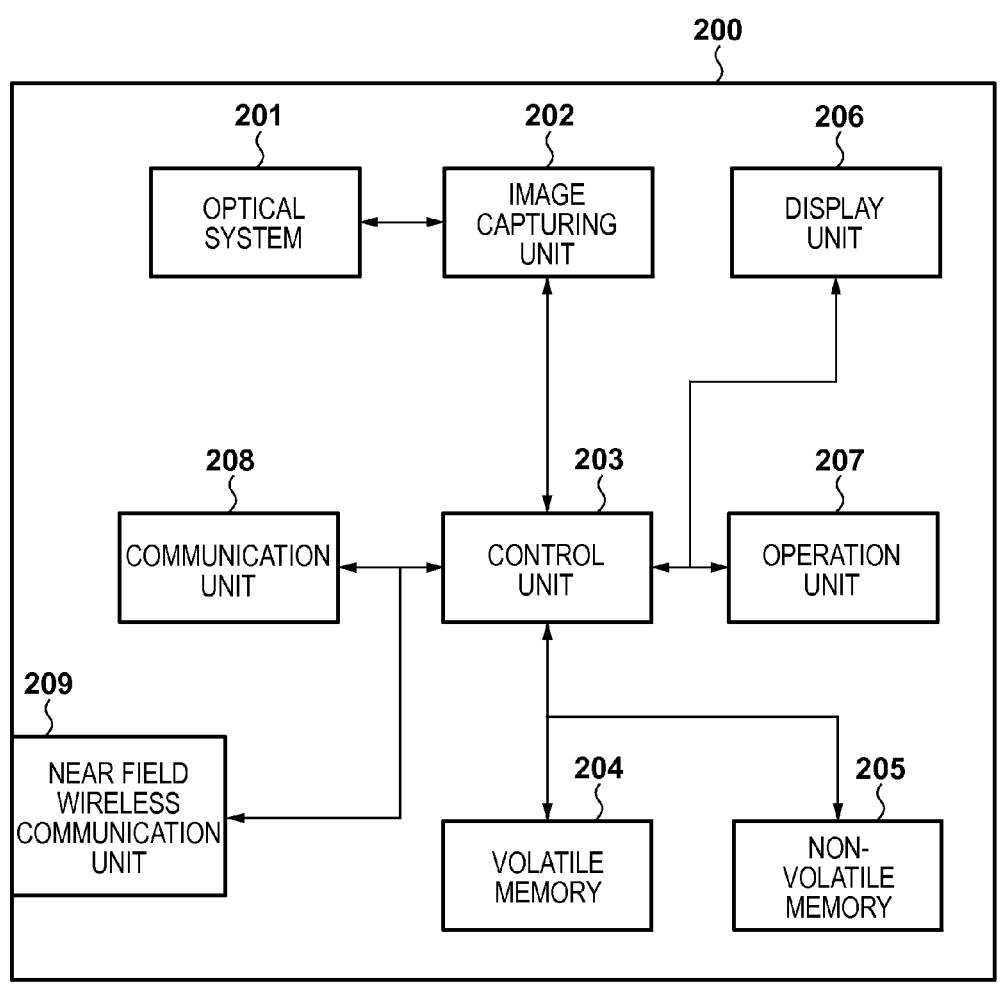
FIG. 2 is a block diagram showing a configuration of a communication partner device according to the First embodiment.

The configuration and functions of the smartphone 200 of an embodiment according to the present invention will be schematically described with reference to FIG. 2.

The smartphone 200 of this embodiment includes an optical system 201, an image capturing unit 202, a control unit 203, a volatile memory 204, a non-volatile memory 207, a display unit 206, an operation unit 207, a communication unit 208, and a near field wireless communication unit 209. These components have the same basic functions as the digital camera 100, and detailed descriptions thereof will be omitted.

Procedure to Start Wireless Connection by User Operation

Figure 3:
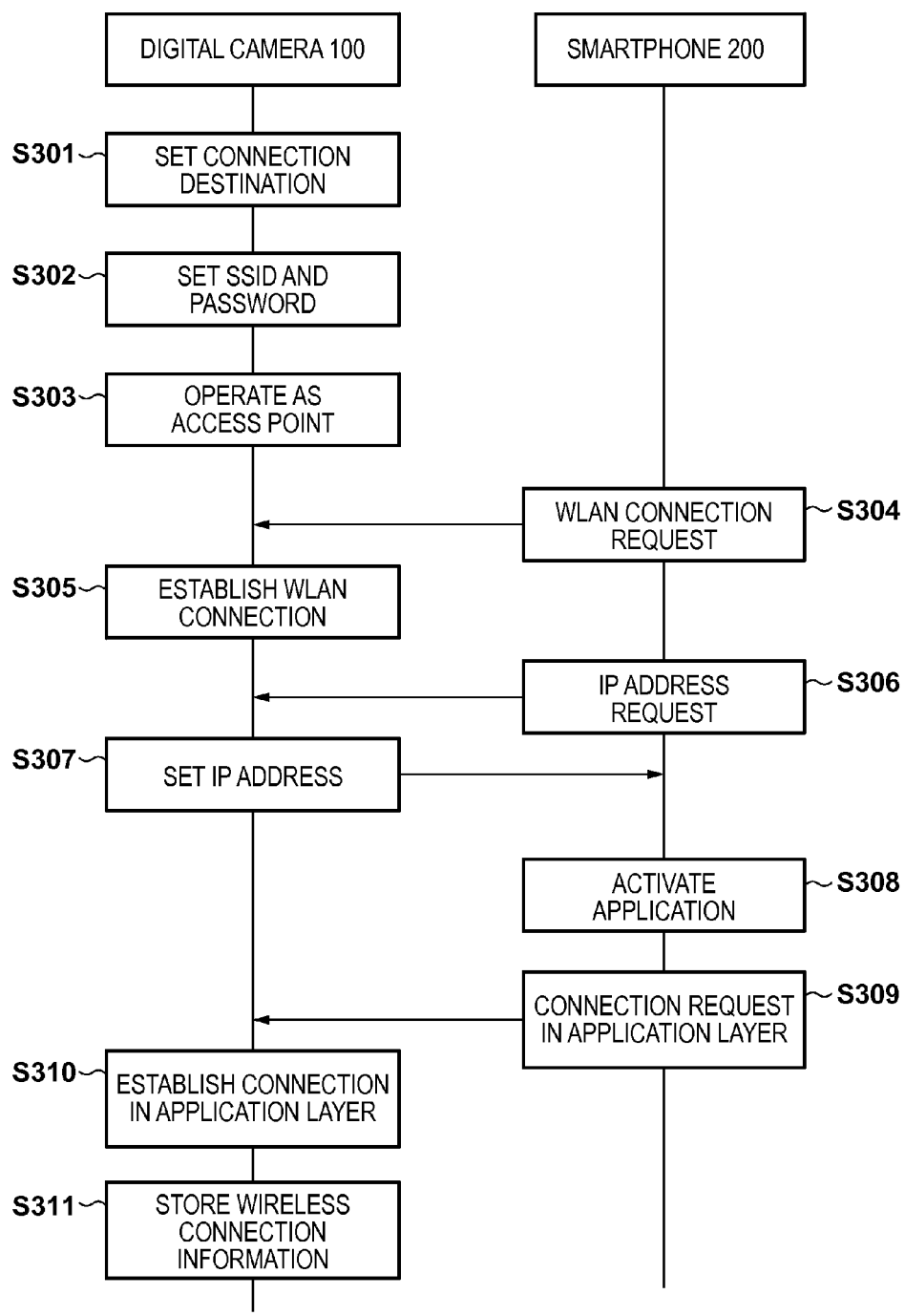
FIG. 3 is a sequence diagram showing the procedure to start a wireless connection by a user operation in the First embodiment.

Subsequently, the procedure to start a wireless connection by a user operation will be described. FIG. 3 is a diagram showing a sequence that is started in response to a menu operation by the user and acceptance of an instruction to start a wireless connection by the digital camera 100. The instruction to start the wireless connection is accepted, for example, by selection of a "wireless function" menu on the screen shown in FIG. 4A.

Figure 4A:
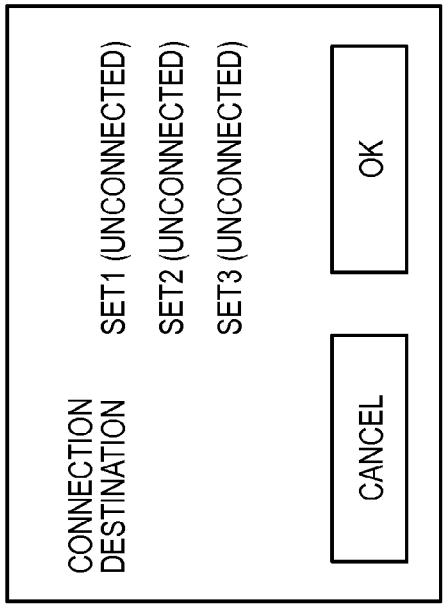
Figure 4B:
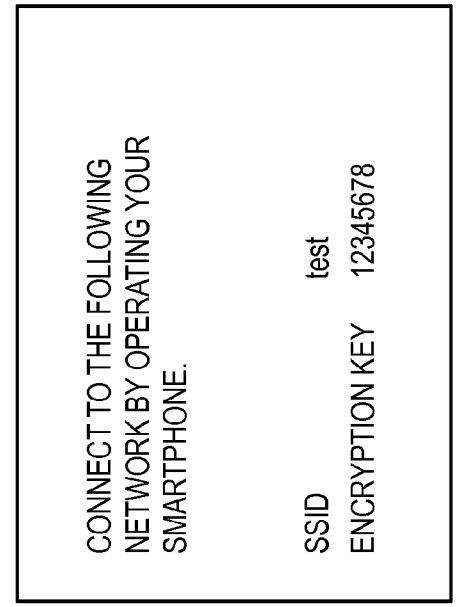

In FIG. 3, the digital camera 100 first sets a connection destination in step S301. Specifically, the screen transitions as shown in FIG. 4B in response to the selection of the "wireless function" menu in FIG. 4A, thereby allowing the user to select a connection destination to be connected. On the screen of FIG. 4B, the user can set a desired connection destination by selecting the connection destination via the operation unit 107. It is herein assumed that three connection destinations of "SET 1, SET 2, and SET 3" are selectable. For example, the user selects "SET 1", and then selects "OK", so that wireless connection information can be stored in "SET 1" after the wireless connection is established.

Figure 4C:
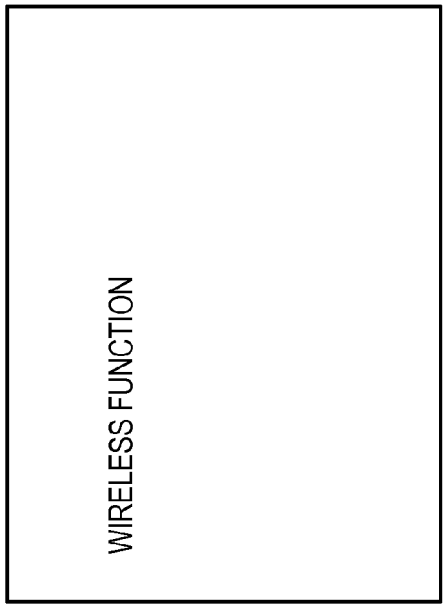

When the user, for example, selects "SET 1" on the screen of FIG. 4B, and selects "OK", the process proceeds to step S302, and the screen transitions as shown in FIG. 4C.

On the screen of FIG. 4C, the user can set arbitrary values as an SSID and a password when the digital camera 100 operates as an access point, by selecting "setting change" via the operation unit 107. In the setting, a character string corresponding to the user's input can be set, for example, by displaying a software keyboard. The thus set SSID and password are displayed on the screen of FIG. 4C as an SSID and an encryption key. FIG. 4C is a screen when the SSID is set to "test", and the encryption key is set to "12345678". If the user selects "OK" on this screen, the process proceeds to step S303 of FIG. 3.

Figure 4D:
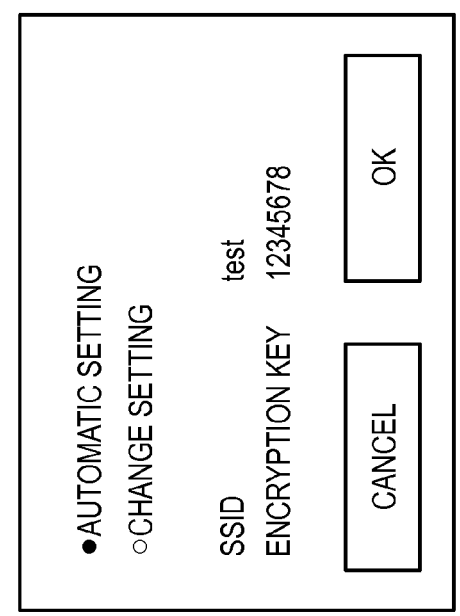

In step S303, the digital camera 100 is activated as an access point, and generates a network using parameters set in step S302. Specifically, transmission of a beacon containing the set SSID is started. Following this, the screen transitions as shown in FIG. 4D. On the screen of FIG. 4D, the set parameters are displayed, and the user is prompted to perform a process for connection with the camera by operating the smartphone 200.

Here, the user operates the smartphone 200 and issues an instruction to participate in the network generated by the digital camera 100. This instruction is realized by selecting the network generated by the digital camera 100 out of networks that are displayed as a list by detecting their beacons in the periphery using a function of the OS of the smartphone 200. The user can know the network generated by the digital camera 100 in the list by checking the SSID displayed on the screen of FIG. 4D.

When this instruction is issued, the smartphone 200 transmits a request to participate in the network to the digital camera 100 in step S304.

Upon reception of this request, the digital camera 100 gives permission to participate in the network in step S305.

In the subsequent step S306, the smartphone 200 requests an IP address from the digital camera 100.

Upon reception of this request, the digital camera 100 assigns an IP address to the smartphone 200 in step S307.

Next, when an application of the smartphone 200 is activated by the user in step S308, the smartphone 200 transmits a connection request in the application layer to the digital camera 100 in step S309.

In step S310, the digital camera 100 establishes a connection with the smartphone 200 in the application layer in accordance with the connection request in the application layer received from the smartphone 200.

As described above, connections are established in a physical layer of wireless LAN in step S305, in an IP layer in step S307, and in an application layer in step S310, thereby completing the wireless connection between the digital camera 100 and the smartphone 200. Following this, the screen transitions as shown in FIG. 4E. The screen of FIG. 4E displays that the digital camera 100 and the smartphone 200 are connected in the application layer, and thus the wireless connection has been completed.

When the wireless connection is established, data exchange between the digital camera 100 and the smartphone 200 is made possible. Specifically, image data stored in the digital camera 100, for example, can be transmitted to the smartphone 200. For example, as shown in FIG. 4F, the list of images recorded in the recording medium 110 is displayed on the display unit 106 of the digital camera 100, so that the user can select a target to be transmitted to the smartphone 200 and transmit it.

In parallel to the process such as the screen transition, the digital camera 100 stores communication parameters used for establishing the connection with the smartphone 200 in the non-volatile memory 105 in step S311 after step S310. The parameters stored herein, for example, are parameters such as an SSID, a password, an IP address, a subnet mask, and a default gateway. The user can use such data by selecting SET 1 in FIG. 4B for connection with the smartphone 200 without inputting them again from the next time. In the case where the parameters have been already stored in SET 1, the screen transitions as shown in FIG. 4G, not to the screen of FIG. 4C. In FIG. 4G, a connection using the stored parameters is started by selecting a connection button. By selecting a setting checking menu, the stored parameters can be displayed. By selecting a change menu, the screen transitions as shown in FIG. 4C, so that acceptance of new parameters and overwriting with the new parameters are performed.

The procedure to start a wireless connection by a user operation is as described above.

Procedure to Start Wireless Connection Using Near Field Wireless Communication

Subsequently, the procedure to start a wireless connection using near field wireless communication will be described. FIG. 5 is a diagram showing a sequence that is started in response to detecting approach of the smartphone 200 by the near field wireless communication unit 109.

In FIG. 5, the digital camera 100 first detects the approach of the smartphone 200 by detecting a carrier radiated from the near field wireless communication unit 209 of the smartphone 200 in step S501. In response to a request from the smartphone 200, the digital camera 100 transmits communication parameters such as an SSID and a password that are necessary for a wireless LAN connection to the smartphone 200 via near field wireless communication.

The parameters such as an SSID and a password transmitted herein are parameters that have been generated in advance as random values by the digital camera 100 in order to establish a wireless connection using near field wireless communication. Further, information to activate an application for connecting the smartphone 200 with the digital camera 100 in an application layer is also transmitted via near field wireless communication. Upon receiving these, the smartphone 200 activates the application corresponding to the information in step S504.

Steps S503 to S510 are the same as steps S303 to S310 of FIG. 3.

Finally, the digital camera 100 stores the communication parameters used for establishing the connection with the smartphone 200, in the non-volatile memory 105 in step S511. The parameters stored herein, for example, are parameters such as an SSID, a password, an IP address, a subnet mask, and a default gateway. However, being different from the case of FIG. 3, the SETs in FIG. 4B are not selected in the sequence using near field wireless communication. Therefore, the parameters are stored as SET 4, which is none of the SETs 1 to 3. As a result of this, when a connection destination menu is displayed, SET 4 that has not been displayed is displayed from the next time as in FIG. 4H. The SET 4 is a history of parameter settings dedicated to a connection using near field wireless communication. Therefore, histories when using near field wireless communication are never recorded in the SETs 1 to 3.

Wireless Connection Process of Digital Camera 100

Next, the process of the digital camera 100 for realizing the aforementioned sequence will be described.

FIG. 6 is a flowchart showing the operation of the digital camera 100 of this embodiment.

The process of FIG. 6 is started when the power of the digital camera 100 is turned on, and is realized by the control unit 103 reading out a program stored in the non-volatile memory 105 to the volatile memory 104 and executing it.

In step S601, the control unit 103 determines whether or not an operation to start a wireless connection has been performed via the operation unit 107. Here, the determination is made based on whether or not a wireless communication menu in FIG. 4A is selected. In the case where the control unit 103 determines that a start operation has been performed, the process proceeds to step S602. Further, in the case where the control unit 103 determines that a start operation has not been performed, the process proceeds to step S609. In step S609, the control unit 103 determines whether or not a near field wireless communication with the smartphone 200 has been started. In the case where the control unit 103 determines that a near field wireless communication has not been started, the process returns to step S601, and the determination of step S601 and the determination of step S609 are repeated. That is, a user operation or approach to the smartphone 200 is waited for. In the case where the control unit 103 determines that a near field wireless communication has been started, the process proceeds to step S610.

First, step S602 will be described.

In step S602, the control unit 103 controls the display unit 106 to display a connection destination selection screen. The screen to be displayed herein is the screen of FIG. 4B. This step corresponds to step S301 of FIG. 3. On the connection destination selection screen, network names of wireless LAN that can be received by the communication unit 108, for example, are displayed as a list, so that the user can select a connection destination of the digital camera 100 from the list of network names. In this embodiment, the connection destination is the smartphone 200 with which the digital camera 100 is wirelessly connected. The digital camera 100 of this embodiment is assumed to be wirelessly connected with a plurality of smartphones, and to be capable of storing a plurality of pieces of wireless connection information for connection with the plurality of smartphones in the non-volatile memory 105. Further, according to the connection destination selection operation by the user, the control unit 103 sets the connection destination whose wireless connection information is to be stored. After the wireless connection is established, the wireless connection information is stored as information on the connection destination selected herein.

In step S603, the control unit 103 controls the display unit 106 to display a connection destination information input screen. The screen displayed herein is the screen of FIG. 4C. This step corresponds to step S302 of FIG. 3. On the connection destination information input screen, an SSID, a password, and the like of the connection destination can be input. When displaying the connection destination information input screen, an SSID and a password generated as default values may have been input thereon, or the user may be allowed to arbitrarily set a default display state thereon.

After the user has input an SSID and a password on the connection destination information input screen, the control unit 103 controls the digital camera 100 to operate as an access point of wireless LAN in step S604. As a result, the digital camera 100 starts transmitting a beacon using the input SSID. The screen displayed herein is the screen of FIG. 4D. This step corresponds to step S303 of FIG. 3. In this state, the digital camera 100 waits for a request to participate in the network from the smartphone 200.

Upon receiving a request to participate in the network from the smartphone 200 in step S604, the process proceeds to step S605.

In step S605, the control unit 103 establishes a wireless connection with the smartphone 200 and sets an IP address. Here, the digital camera 100 may operate as a DHCP server to assign an IP address to the smartphone 200. This step corresponds to step S305 and step S307 of FIG. 3.

In step S606, the control unit 103 establishes a wireless connection with the smartphone 200 in an application layer.

As a protocol of the application layer, PTP (Picture Transfer Protocol) is used, for example.

In step S607, the control unit 103 determines whether the connection is established in step S606 as a result of the determination of YES in step S601, or as a result of the determination of YES in step S609. In other words, it determines whether the connection is started by a user operation, or the connection has been started using near field wireless communication. Since the case of performing steps S601 to S603 is described herein, it would be determined that the connection is established as a result of the determination of YES in step S601. That is, it would be determined that the connection is started by a user operation. In this case, the process proceeds to step S608.

In step S608, the control unit 103 stores wireless connection information such as an SSID, a password, and an IP address used for connection with the smartphone 200 to the non-volatile memory 105. This process corresponds to step S311 of FIG. 3.

The process subsequent to step S602 is as described above.

Subsequently, the process subsequent to step S610 will be described.

In step S610, the control unit 103 transmits parameters that have been generated in advance as random values to the smartphone 200 via near field wireless communication, in order to establish a wireless connection using near field wireless communication. Further, information to activate an application for connecting the smartphone 200 with the digital camera 100 in an application layer is also transmitted via near field wireless communication. This step corresponds to step S601 of FIG. 6. Upon the completion of this process, the process proceeds to step S604.

Steps S604 to S606 are as described above.

Next, in step S607, the control unit 103 determines whether the connection is established in step S606 as a result of the determination of YES in step S601, or as a result of the determination of YES in step S609. It would be determined herein that the connection is established as a result of the determination of YES in step S609. In this case, the process proceeds to step S611.

In step S611, the control unit 103 stores wireless connection information in another region that is different from the storage region in step S608.

As described above, the digital camera 100 establishes connections in a physical layer of wireless LAN and in an IP layer in step S605, and establishes a connection in an application layer in step S606, thereby completing the wireless connection between the digital camera 100 and the smartphone 200. Thereafter, the digital camera 100 and the smartphone 200 communicate with each other, which enables the user to remotely operate the digital camera 100 by operating the smartphone 200.

In the case where a wireless connection is intended to be established again after the communication between the digital camera 100 and the smartphone 200 is disconnected, a desired SET in FIG. 4B, for example, may be selected. The wireless connection information that has been stored once in a SET in step S608 or step S611 is read out, for example, by selecting a desired SET in FIG. 4B, and is used for simplifying the subsequent reconnection procedure. This enables a wireless connection with the smartphone 200 to be established again without the need for the user to input an SSID or to make an approach to the smartphone 200.

Configuration of Wireless Connection Information

Next, wireless connection information stored during the aforementioned wireless connection will be described with reference to FIG. 7.

Hereinafter, it is assumed that both a wireless connection via the operation unit 107 and a wireless connection using near field wireless communication have been established between the digital camera 100 and the smartphone 200. In this case, in a storage region 701 of the non-volatile memory 105 of the digital camera 100, wireless connection information when a wireless connection is established by a wireless connection setting operation and wireless connection information when a wireless connection is established using near field wireless communication are separately stored in different storage regions 702 and 703.

When selecting a connection destination in step S602 of FIG. 6 or establishing a wireless connection again after a communication with the smartphone 200 is disconnected, selectable connection destinations are first displayed as a list, as on the screens of FIG. 4B and FIG. 4H. At this time, the control unit 103 of the digital camera 100 reads out the wireless connection information when the wireless connection is established by the wireless connection setting operation and the wireless connection information when the wireless connection is established using near field wireless communication from the storage regions 702 and 703 of the non-volatile memory 105, and uses them for displaying the list. On such a screen, the user selects a desired connection destination via the operation unit 107 so as to set the connection destination, thereby establishing a wireless connection.

For example, when the user selects "SET 1", the digital camera 100 operates as an access point, where the SSID of the access point is "test" and the password thereof is "12345678". Then, the user performs a wireless connection setting operation to the access point using the smartphone 200, thereby enabling a wireless connection between the digital camera 100 and the smartphone 200. In the example shown in the figure, "SET 1", "SET 2", "SET 3" are stored in the storage region 702 as wireless connection information stored when a wireless connection is established by a wireless connection setting operation in the digital camera 100.

Further, for example, when the user selects "SET 4 (NFC)", the digital camera 100 operates as an access point, where the SSID of the access point is "testNFC" and the password thereof is "abcde123". Then, the user brings the digital camera 100 close to the smartphone 200, thereby enabling a wireless connection to be established between the digital camera 100 and the smartphone 200. In the example shown in the figure, "SET 4 (NFC)" is stored in the storage region 703 as wireless connection information stored when a wireless connection is established using near field wireless communication.

In this embodiment, the case where the history information when a wireless connection is established by a wireless connection setting operation is stored in the non-volatile memory 105 in a larger amount than the wireless connection information when a wireless connection is established using near field wireless communication is described as an example, but is not limited to this. For example, the number of histories stored when a wireless connection is established using near field wireless communication may be plural or may be the same as the number of histories when a wireless connection is established by a wireless connection setting operation. In the case where a plurality of histories are stored, the older history is overwritten in chronological order, each time when a wireless connection is established using near field wireless communication. Further, in the case where a wireless connection is established by a wireless connection setting operation, the user selects any one of SET 1 to SET 3, and stores a history in a region corresponding to the selected SET, but the user can employ a system of overwriting the older history without selecting any of the SETs.

The reason why the storage destination of wireless connection information in the case where a wireless connection is established using near field wireless communication is thus separated from that in the case where a wireless connection is established by a wireless connection setting operation via the operation unit 107 is as follows. That is, in the case where a wireless connection is established using near field wireless communication, there is a need to automatically ensure a region to keep the history since there is no selection of the SETs. However, if histories are shared by the case where a wireless connection is established by a wireless connection setting operation and the case where a wireless connection is established using near field wireless communication, the histories will be automatically deleted eventually, since it is impossible to store an infinite number of histories. In particular, near field wireless communication allows a wireless connection to be easily established merely by bringing the digital camera 100 close to the smartphone 200 without operating the digital camera 100, and therefore the connection can be established more conveniently. Therefore, if histories are shared, the frequency at which connection histories are stored is likely to be higher than in the case where a wireless connection is established by a wireless connection setting operation via the operation unit 107. Therefore, the inconvenience that the user unintentionally deletes necessary histories tends to occur. In order to prevent the inconvenience, the storage destinations are separated.

In the case of establishing a wireless connection by a wireless connection setting operation via the operation unit 107, after the wireless connection has been established with a connection destination selected by the user, wireless connection information is stored in an overwriting manner in the connection destination. In the case of establishing a wireless connection using near field wireless communication, after the wireless connection has been established using near field wireless communication, wireless connection information in the storage region 703 is stored in an overwriting manner since only one connection destination (only SET 4) exists in this case.

According to this embodiment, wireless connection information is stored in connection destinations separately between the case of establishing a wireless connection by a wireless connection setting operation and the case of establishing a wireless connection using near field wireless communication, thereby eliminating the need for the user to select a connection destination in the case of establishing a wireless connection using near field wireless communication. Further, existing information on the wireless connection by a wireless connection setting operation in the connection destinations is prevented from being overwritten and stored unintentionally.

Second Embodiment

Next, a wireless connection information storing process according to the second embodiment will be described with reference to FIG. 8 and FIG. 9.

In this embodiment, after a wireless connection is established by a wireless connection setting operation and wireless connection information is stored, a wireless connection is established using near field wireless communication by bringing the digital camera 100 and the smartphone 200 close to each other. The case where information on the wireless connection using near field wireless communication is thus stored in an overwriting manner in the connection destination selected by the user will be described.

When the user selects a connection destination by performing a wireless connection setting operation (steps S301 and S302 of FIG. 3), the screen shown in FIG. 8A is displayed on the display unit 106. Thereafter, when the user brings the digital camera 100 and the smartphone 200 close to each other so as to establish a wireless connection using near field wireless communication, information on the wireless connection using near field wireless communication is stored in an overwriting manner in the connection destination selected by the user in the non-volatile memory 105. The user also can establish a wireless connection by setting an SSID and a password via the operation unit 107 on the screen of FIG. 8A, without establishing a wireless connection using near field wireless communication (the process subsequent to step S303 of FIG. 3).

For example, in the case where a wireless connection is established using near field wireless communication after the user selects "SET 1" as a connection destination on the screen of FIG. 4B, information on the wireless connection using near field wireless communication is stored in an overwriting manner in "SET 1". At this time, the name of the connection destination may be rewritten as "SET 1(NFC)", as shown in FIG. 8B, so that the user can recognize it.

Figure 9:
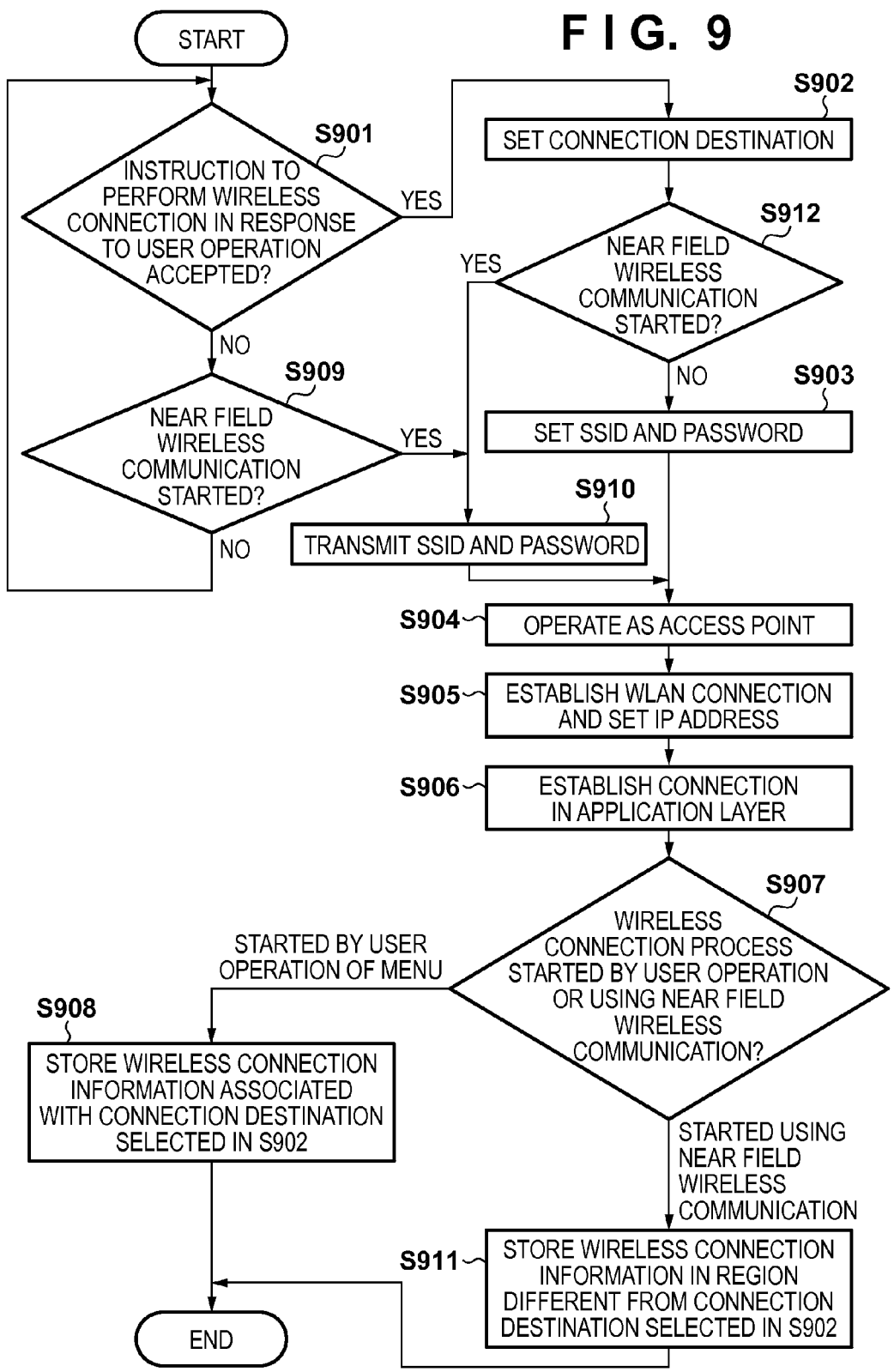
FIG. 9 is a flowchart showing the wireless connection information storing process according to the Second embodiment.

FIG. 9 is a flowchart showing a process of the digital camera 100 for realizing the aforementioned operation.

This flowchart shows an additional process added between step S602 and step S603 in the flowchart of FIG. 6. Therefore, a part different from the flowchart of FIG. 6 will be mainly described.

Steps S901 to S902 are the same as steps S601 to S602 of FIG. 6.

In step S912 following step S902, the control unit 103 performs the same process as step S909 (the same process as step S609 of FIG. 6). That is, it determines whether or not near field wireless communication with the smartphone 200 has been started.

In the case where it is determined that a near field wireless communication has not been started, the process proceeds to step S903, and a connection is established by accepting an input of an SSID and others by the user. On the other hand, in the case where it is determined that a near field wireless communication has been started, the process proceeds to step S910. In step S910, the same process as step S610 of FIG. 6 is performed. That is, the process flow is the same as in the case where a connection process is started using near field wireless communication.

In steps S904 to S906, the same process as in step S604 to step S606 of FIG. 6 is performed.

Further, in step S907, the same process as step S607 of FIG. 6 is performed. That is, it is determined whether or not the process in step S909 is YES based on the determination of whether or not the process in step S601 is YES. Therefore, even if the determination in step S912 is YES and the process in step S910 is performed, it is determined that the start herein is performed by an operation of the user as a determination result, since the determination in step S901 is YES in this case.

Further, in step S908, an SSID and a password input and set by a user operation in step S903 are recorded in a region corresponding to the connection destination selected in step S902. In addition to this, in the case where step S910 is performed as a result of the determination of YES in step S912, the connection information transmitted in step S910 is recorded in the region corresponding to the connection destination selected in step S902.

In step S911, the same process as step S611 of FIG. 6 is performed.

In this embodiment, in the case where a wireless connection is established using near field wireless communication together with a user operation, the history is recorded in a region selected by a user operation instead of being recorded as a connection history using near field wireless communication, even if near field wireless communication is used. Thus, the history storage region can be ensured and the procedure to establish a connection can be simplified at the same time.

Third Embodiment

Next, a wireless connection information storing process according to the third embodiment will be described with reference to FIG. 10.

In this embodiment, an example in which a consideration is given to the case where the digital camera 100 has a plurality of communication modes will be described.

First, the digital camera of this embodiment has a mode (hereinafter, referred to as selection transmission mode) to select and transmit image data recorded in the recording medium 110 of the digital camera 100 after being connected with the smartphone 200, as described in FIG. 4F. In addition to this, for the purpose of more convenient transmission of image data, a mode (touch transfer mode) in which one image piece that is being reproduced (e.g., displayed on a screen) in the digital camera 100 is automatically transmitted by establishing a wireless LAN connection by starting near field wireless communication is provided therein. A transition to the touch transfer mode is caused by starting a near field wireless communication in the state where only one image piece is reproduced. In this case, after a wireless LAN connection is established, the image that is being reproduced is automatically transmitted to the smartphone 200 via the wireless LAN without the need for a user operation. In the following description, the digital camera 100 having these two modes is described in order to simplify the description, but other modes also may be provided therein.

Here, in the touch transfer mode, there is no need to select images to be transmitted after the connection since the image that is being reproduced is transmitted. Therefore, the user can use it more easily and conveniently, as compared to the selection transmission mode. For example, it is convenient in the case where an image that is being reproduced is intended to be sequentially shared by a plurality of friends' smartphones. Accordingly, as compared to the selection transmission mode, the use frequency of the touch transfer mode is likely to be high, and further it is highly possible that the connection partner is temporary. Therefore, of these modes, the digital camera 100 of this embodiment stores histories of communication in the selection transmission mode and does not store histories of communication in the touch transfer mode.

Hereinafter, a process of the digital camera 100 for realizing the aforementioned operation will be described with reference to FIG. 10.

Figure 10:
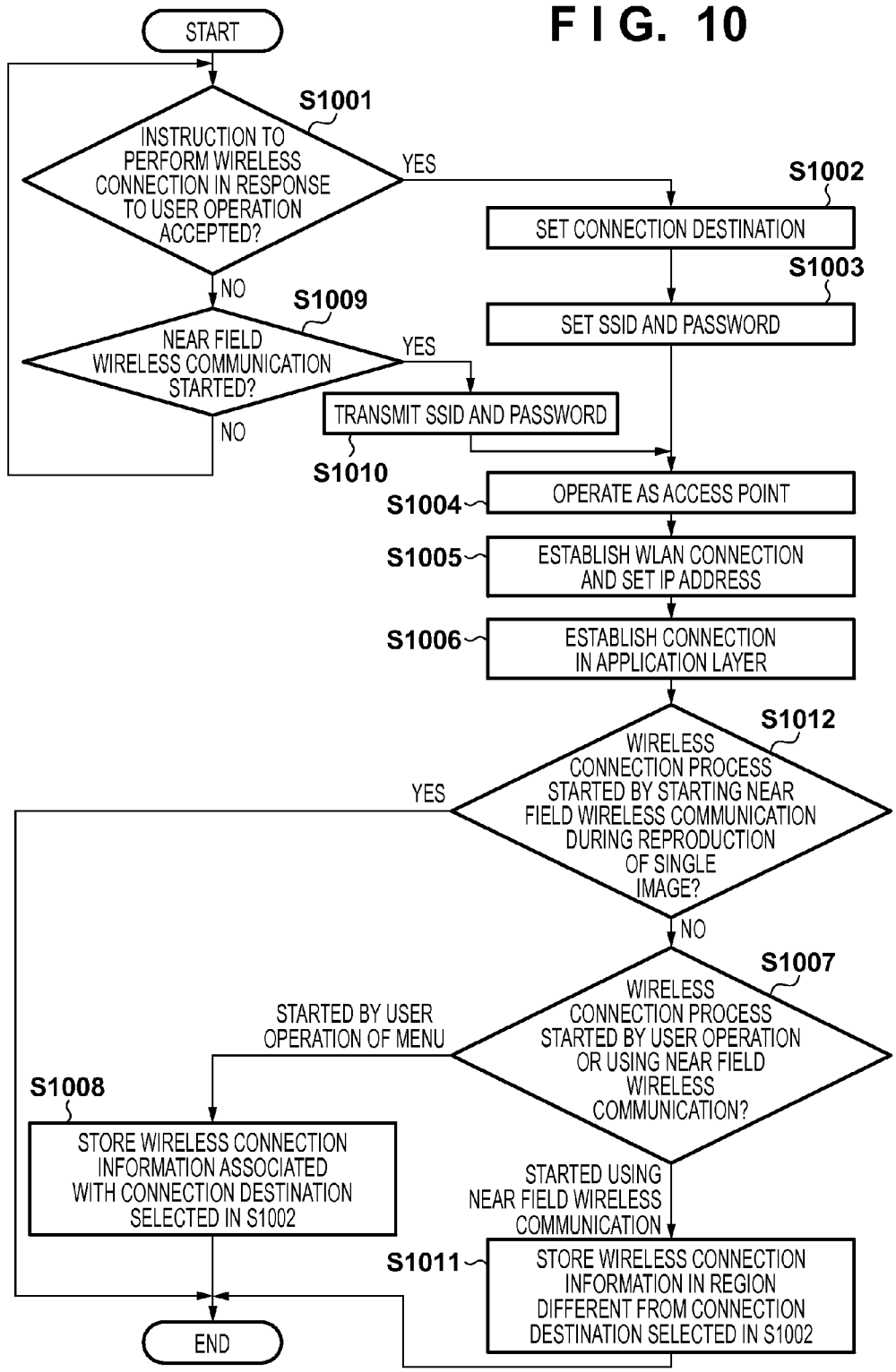
FIG. 10 is a flowchart showing a wireless connection information storing process according to the third embodiment.

In step S1001 to step S1008 of FIG. 10, the same process as in step S301 to step S308 of FIG. 3 is first performed.

In the subsequent step S1012, the control unit 103 determines whether or not a wireless LAN connection using near field wireless communication is started while one image piece is being reproduced. In other words, it determines whether or not one image piece is being reproduced at the time when the determination of YES is made in step S1009.

Here, in the case where it is determined that a wireless LAN connection using near field wireless communication is started while one image piece is being reproduced, this flowchart ends, and a transition to a service in an application layer is performed. In other words, this flowchart ends without performing the process in steps S1007, S1008, and S1011 (which is the same process respectively in steps S307, S308, and S311 of FIG. 3). That is, the history is not stored.

On the other hand, in the case where it is determined that a wireless LAN connection using near field wireless communication is not started while one image piece is being reproduced, the process subsequent to step S1007 is performed. That is, the history is stored in a region corresponding to the start of the process.

According to this embodiment, a sequence in which a history is not stored is provided in a mode in which a connection is established more conveniently, in addition to separation of connection regions. This enables histories to be managed more appropriately.

Fourth Embodiment

Next, a wireless connection information storing process according to the fourth embodiment will be described with reference to FIG. 11.

In this embodiment, a mode that determines whether or not wireless connection information is stored, depending on the communication partner device of the digital camera 100, will be described.

In this embodiment, it is assumed that the digital camera 100 is wirelessly connected with a server storing images using near field wireless communication, and images of the digital camera 100 are forwarded to the server. As such a server, a hard disk drive utilizing wireless communication for a home network storage is known, and can be used for making a backup of numerous images captured by the digital camera. The server storing such images is usually installed indoors, and the situation in which it is difficult to bring the digital camera 100 close to the server is less likely to occur, unless the digital camera 100 is installed using a tripod or the like. Further, since the owner of the digital camera 100 and the owner of the server are often the same person, there is probably no need to store a plurality of connection destinations. Accordingly, in the case where the communication partner device is a server, overwriting a history by storing wireless connection information in a wireless connection is usually unnecessary, and there is rather a concern that a necessary history is overwritten. Therefore, the digital camera 100 of this embodiment does not store a history when a partner of a wireless LAN connection using near field wireless communication is a server.

A process of the digital camera 100 for realizing the aforementioned operation will be described with reference to FIG. 11.

Figure 11:
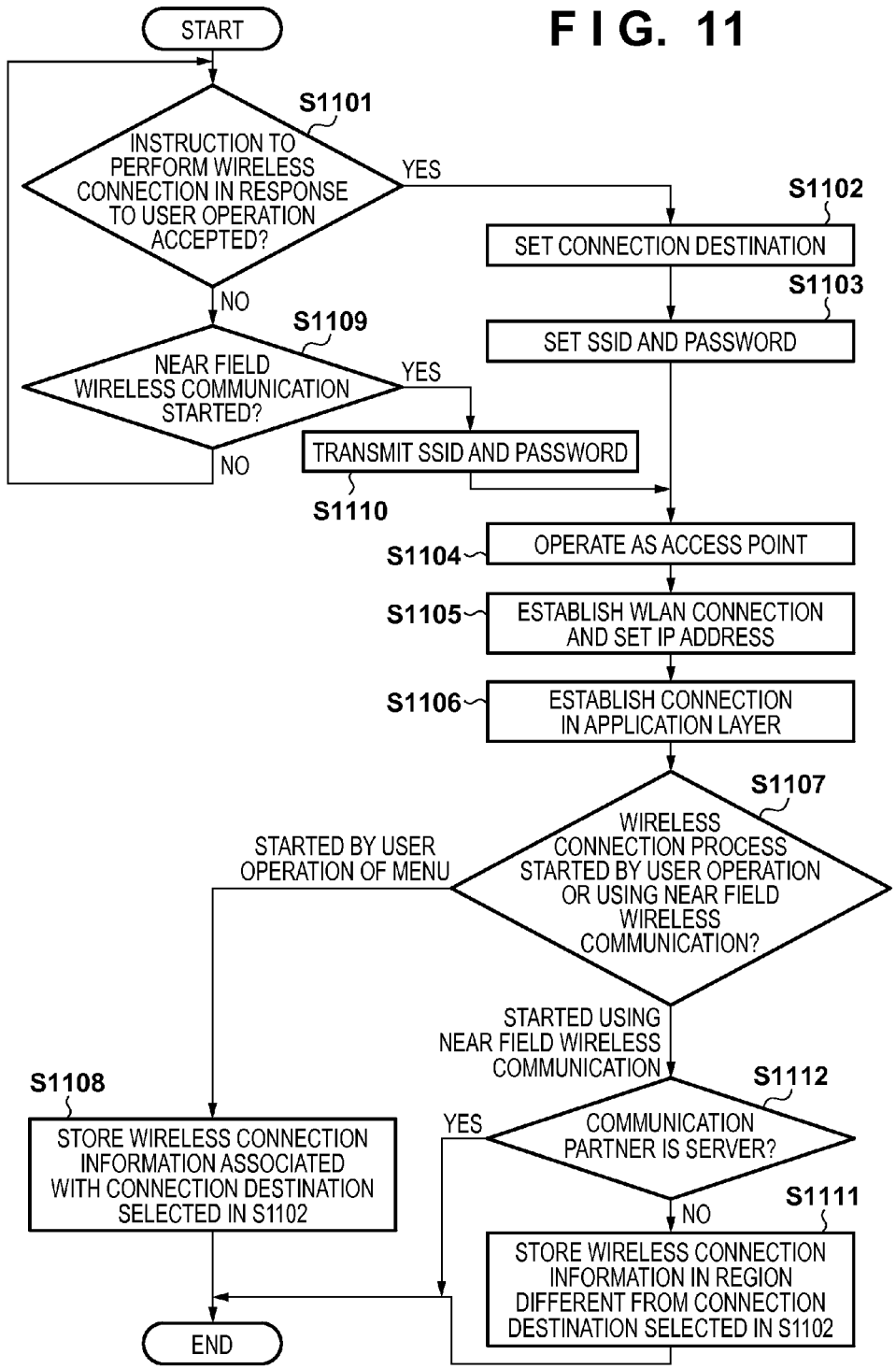
FIG. 11 is a flowchart showing a wireless connection information storing process according to the fourth embodiment.

In steps S1101 to S1108 of FIG. 11, the same process as in step S301 to step S308 of FIG. 3 is first performed.

In the case where the control unit 103 determines that a wireless LAN connection has been started using near field wireless communication in step S1107, the process in step S1112 is performed before the process in step S1111 (the same process as in step S311 of FIG. 3) is performed.

In step S1112, the control unit 103 determines whether or not the communication partner is a server. In the case where it is determined to be a server, this flowchart ends without performing step S1111, and a transition to a service in an application layer is performed. That is, the history is not stored.

On the other hand, in the case where it is determined not to be a server, the process in step S1111 is performed. That is, the history is stored in a region corresponding to the start of the process.

According to this embodiment, it is possible to omit an unnecessary process to store useless wireless connection information in a wireless connection when there is no need to store the wireless connection information in the wireless connection, for example, when the communication partner device is a server.

In the aforementioned embodiments, examples in which the present invention is applied to an image capturing apparatus such as a digital video camera are described, but the present invention is not limited to these examples, and the present invention can be applied to any apparatus as long as it is capable of establishing a wireless connection with an external device using a wireless communication function including near field wireless communication.

Other Embodiments

In the aforementioned embodiments, examples in which the digital camera detects a carrier output from the smartphone, thereby starting a near field wireless communication are described. That is, examples in which the digital camera functions as a target, and the smartphone functions as an initiator are described. Their roles may be reversed. That is, the configuration may be such that the digital camera 100 periodically outputs a carrier, in response to which the smartphone 200 starts a communication.

Further, in the fourth embodiment mentioned above, the case where whether or not a history is stored is controlled depending on the type of the communication partner device is described. In this regard, whether or not a history is stored may be switched depending on the function of the communication partner, for example. That is, the history is not stored in the case where the communication partner is a device that can be connected only by near field wireless communication (such as a device having no operation members). This is because storing the history is meaningless when a wireless LAN connection cannot be established by selecting a history (for example, when the partner device has no operation members, it is impossible to trigger the process on the partner device side that corresponds to a wireless LAN connection process by selecting a history in the own machine). In this case, it is determined, in step S1112 of FIG. 11, whether or not the partner device can be connected only by near field wireless communication, instead of determining the type of the partner device. As a reference for the determination, a table in which the type and function of devices are associated with each other may be prepared, so that the function of the partner device can be determined from the type thereof with reference to this table.

Further, in the aforementioned embodiments, examples in which the digital camera 100 serves as an AP regardless of the type of the partner device are described. In this regard, in the case where the partner device is a device having comparatively stable power supply such as a server, it is more efficient to allow the partner device to serve as an AP. Therefore, the digital camera 100 may be configured to switch whether to serve as an AP on its own, or to establish a connection with the partner serving as an AP, depending on the connection partner. Whether power supply to the connection partner is more stable or not is determined with reference to the type thereof. The type to be referred to can be determined, for example, by allowing the user to select which type is intended to be connected before the connection, or by obtaining information of the partner device using near field wireless communication.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-104514, filed May 20, 2014 which is hereby incorporated by reference herein in its entirety.

What is claimed is:

1. A communication apparatus comprising:
   a first communication unit configured to communicate with an external apparatus and to share, with the external apparatus, a second communication parameter for establishing a communication with the external apparatus using a second communication unit that is different from the first communication unit;
   an accepting unit configured to accept a user operation;
   the second communication unit configured to communicate with the external apparatus using one of a first communication parameter that is set based on the user operation accepted by the accepting unit and the second communication parameter with the external apparatus by the first communication unit;
   a holding unit configured to hold the first communication parameter used in the communication with the external apparatus using the second communication unit and the second communication parameter used in the communication with the external apparatus using the second communication unit; and
   a control unit configured to control the holding unit, in the case where the holding unit holds the second communication parameter that is newly shared by the first communication unit, so as to hold the second communication parameter distinctly from the first communication parameter and hold the second communication parameter without overwriting the first communication parameter that is already held by the holding unit, wherein the control unit, in response to a request from a user, presents the first communication parameter and the second communication parameter that are held by the holding unit to the user so that the first and second communication parameters are distinguishable with each other and reusable, wherein, in a case where the first communication parameter is used in the communication with the external apparatus using the second communication unit, the second communication parameter is not used in the communication with the external apparatus using the second communication unit, and wherein, in a case where the second communication parameter is used in the communication with the external apparatus using the second communication unit, the first communication parameter is not used in the communication with the external apparatus using the second communication unit.

2. The apparatus according to claim 1, wherein the control unit controls the holding unit, in the case where the holding unit holds the second communication parameter, to hold the second communication parameter without deleting the first communication parameter.

3. The apparatus according to claim 1, wherein the control unit controls the holding unit, in the case where the holding unit holds the first communication parameter, to hold the first communication parameter without deleting the second communication parameter.

4. The apparatus according to claim 1, wherein the second communication parameter is distinguished from the first communication parameter by separating a recording region for recording the second communication parameter from a recording region for recording the first communication parameter.

5. The apparatus according to claim 1, wherein the control unit controls the holding unit, in the case where the holding unit holds the second communication parameter that is newly shared, to hold the newly shared second communication parameter by automatically overwriting the second communication parameter that is already held.

6. The apparatus according to claim 1, wherein the accepting unit accepts an instruction to delete the first communication parameter that is currently held by the holding unit.

7. The apparatus according to claim 1, wherein the second communication parameter shared with the external apparatus is generated in advance so as to automatically include a random value.

8. The apparatus according to claim 1, wherein the second communication parameter is transmitted to the external apparatus via the first communication unit.

9. The apparatus according to claim 1, wherein an upper limit of the number to be held as the first communication parameter and an upper limit of the number to be held as the second communication parameter are different from each other.

10. The apparatus according to claim 9, wherein the upper limit of the number to be held as the second communication parameter is 1.

11. The apparatus according to claim 1, wherein the second communication unit generates a network using one of the first communication parameter that is set based on the user operation accepted by the accepting unit and the second communication parameter shared by the first communication unit.

12. The apparatus according to claim 11, wherein the communication apparatus functions as a DHCP server, and assign an IP address to the external apparatus via the second communication unit.

13. The apparatus according to claim 1, further comprising:
a determination unit configured to determine a type or function of the external apparatus, wherein
in the case where the communication with the external apparatus using the second communication unit is established by sharing the second communication parameter, the control unit controls the holding unit whether or not to hold the second communication parameter depending on a type or function of the external apparatus.

14. The apparatus according to claim 1, further comprising:
an image capturing unit configured to generate image data by capturing an object, wherein
the image data is transmitted to the external apparatus by the second communication unit, and is not transmitted to the external apparatus by the first communication unit.

15. The apparatus according to claim 14, wherein the control unit controls the communication apparatus to operate in one of a plurality of modes including an image capturing mode for capturing an image by the image capturing unit, a single reproduction mode for displaying data of a single captured image on a single screen, and a multiple reproduction mode for displaying data of a plurality of captured images on a single screen, and
in the case where the communication with the external apparatus is established via the second communication unit using the second communication parameter shared during a predetermined mode among the plurality of modes, the control unit controls the holding unit so as not to hold the second communication parameter used for establishing the communication.

16. The apparatus according to claim 1, wherein the control unit controls a display unit to display information indicating the first communication parameter and the second communication parameter held by the holding unit, and
the display unit displays the information indicating the first communication parameter and the second communication parameter in a manner such that the first communication parameter and the second communication parameter are distinguishable.

17. The apparatus according to claim 16, wherein in the case where instruction to select the information indicating that the first communication parameter and the second communication parameter are accepted from the user, the control unit controls the second communication unit to start the communication using the communication parameter held by the holding unit.

18. The apparatus according to claim 1, wherein the second communication unit is capable of communication for a longer distance than the first communication unit.

19. A control method of a communication apparatus which has a first communication unit and a second communication unit configured to communicate with an external apparatus, the method comprising:
a first communication step of sharing, with the external apparatus, a second communication parameter for establishing a communication with the external apparatus using the second communication unit that is different from the first communication unit;
a step of accepting an user operation;
a second communication step of communicating with the external apparatus by the second communication unit using one of a first communication parameter that is set based on the accepted user operation and the second communication parameter shared with the external apparatus in the first communication step;
a holding step of holding the first communication parameter used in the communication with the external apparatus by the second communication unit and the second communication parameter used in the communication with the external apparatus using the second communication unit; and
in the ease where the second communication parameter that is newly shared in the first communication step is held in the holding step, a control step of controlling the second communication parameter so as to hold the second communication parameter distinctly from the first communication parameter and to hold the second communication parameter without overwriting the first communication parameter that is already held in the holding step,
wherein the control step, in response to a request from a user, presents the first communication parameter and the second communication parameter that are held in the holding step to the user so that the first and second parameters are distinguishable with each other and reusable,
wherein, in a case where the first communication parameter is used in the second communication step, the second communication parameter is not used in the second communication step, and
wherein, in a case where the second communication parameter is used in the second communication step, the first communication parameter is not used in the second communication step.

20. A non-transitory computer-readable storage medium storing a program for causing a computer to execute a control method of a communication apparatus which has a first communication unit and a second communication unit configured to communicate with an external apparatus, the method comprising:
a first communication step of sharing, with the external apparatus, a second communication parameter for establishing a communication with the external apparatus using the second communication unit that is different from the first communication unit;
a step accepting an user operation;
a second communication step of communicating with the external apparatus by the second communication unit using one of a first communication parameter that is set based on the accepted user operation and the second communication parameter shared with the external apparatus in the first communication step;
a holding step of holding the first communication parameter used in the communication with the external apparatus by the second communication unit and the second communication parameter used in the communication with the external apparatus using the second communication unit; and
in the case where the second communication parameter that is newly shared in the first communication step is held in the holding step, a control step of controlling the second communication parameter so as to hold the second communication parameter distinctly from the first communication parameter an to hold the second communication parameter without overwriting the first communication parameter that is already held in the holding step,
wherein the control step, in response to a request from a user, presents the first communication parameter and the second communication parameter that are held in the holding step to the user so that the first and second parameters are distinguishable with each other and reusable,
wherein, in a case where the first communication parameter is used in the second communication step, the second communication parameter not used in the second communication step, and
wherein, in a case where the second communication parameter is used in the second communication step, the first communication parameter is not used in the second communication step.

21. A communication apparatus comprising:
a proximity communication unit configured to communicate with an external apparatus and to share SSID with the external apparatus;
an accepting unit configured to accept a user operation for inputting SSID;
a WLAN communication unit configured to communicate with the external apparatus using one of the SSID shared with the external apparatus by the proximity communication unit and the SSID inputted from user via the accepting unit;
a holding unit; and
a control unit configured to control the holding unit, in a case where the WLAN communication unit uses the SSID shared with the external apparatus by the proximity communication unit for establishing a communication with the external apparatus, so as to hold the SSID shared with the external apparatus by the proximity communication unit distinctly from an already holding SSID inputted from user via the accepting unit, and in a case where the WLAN communication unit uses the SSID inputted from user via the accepting unit for establishing the communication with the external apparatus, so as to hold the SSID inputted from user via the accepting unit distinctly from an already holding SSID shared with the external apparatus by the proximity communication unit,
wherein, in a case where the WLAN communication unit uses the SSID shared with the external apparatus by the proximity communication unit for establishing a communication with the external apparatus, the SSID inputted from user via the accepting unit is not used in the communication with the external apparatus using the second communication unit, and
wherein, in a case where the WLAN communication unit uses the SSID inputted from user via the accepting unit for establishing a communication with the external apparatus, the SSID shared with the external apparatus by the proximity communication unit is not used in the communication with the external apparatus using the second communication unit.

22. A communication apparatus comprising:
a first communication unit configured to communicate with an external apparatus;
an accepting unit configured to accept a user operation;
a second communication unit configured to communicate with the external apparatus using one of a first communication parameter that is set based on the user operation accepted by the accepting unit and a second communication parameter shared with the external apparatus by the first communication unit;

a holding unit configured to hold the first communication parameter used in the communication with the external apparatus using the second communication unit and the second communication parameter used in the communication with the external apparatus using the second communication unit; and a control unit configured to control the holding unit, in the case where the holding unit holds the second communication parameter that is newly shared by the first communication unit, so as to hold the second communication parameter distinctly from the first communication parameter, wherein, in a case where the first communication parameter is used in the communication with the external apparatus using the second communication unit, the second communication parameter is not used in the communication with the external apparatus using the second communication unit, and wherein, in a case where the second communication parameter is used in the communication with the external apparatus using the second communication unit, the first communication parameter is not used in the communication with the external apparatus using the second communication unit.

23. A communication apparatus comprising:

a proximity communication unit;

an accepting unit configured to accept a user operation;

a WLAN communication unit;

a holding unit; and a control unit;

wherein, in a case where a communication parameters inputted from user via the accepting unit, the control unit controls the WLAN communication unit to establish a communication with an external apparatus using the communication parameter inputted from user via the accepting unit and controls the holding unit to hold the communication parameter inputted from user via the accepting unit, wherein, in a case where a communication parameter is shared with the external apparatus via the proximity communication unit, the control unit controls the WLAN communication unit to establish the communication with the external apparatus using the communication parameter shared via the proximity communication unit and controls the holding unit not to overwrite the held communication parameter inputted from user via the accepting unit by the communication parameter shared via the proximity communication unit, wherein, in a case where the WLAN communication unit uses the communication parameter shared with the external apparatus via the proximity communication unit for establishing the communication with the external apparatus, the parameter inputted from user via the accepting unit is not used in the communication with the external apparatus using the WLAN communication unit, and wherein, in a case where the WLAN communication unit uses the parameter inputted from user via the accepting unit for establishing a communication with the external apparatus, the parameter shared with the external apparatus by the proximity communication unit is not used in the communication with the external apparatus using the WLAN communication unit.

* * * * *